United States Patent
Hyziak et al.

(10) Patent No.: US 8,145,218 B2
(45) Date of Patent: Mar. 27, 2012

(54) METHOD AND SYSTEM FOR WIRELESS HANDOFFS

(75) Inventors: Janusz Hyziak, Des Plaines, IL (US); Peisong Huang, Elk Grove Vil, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 848 days.

(21) Appl. No.: 12/235,122

(22) Filed: Sep. 22, 2008

(65) Prior Publication Data

US 2010/0075676 A1 Mar. 25, 2010

(51) Int. Cl.
*H04W 36/00* (2009.01)

(52) U.S. Cl. ........ 455/436; 455/437; 455/429; 455/439; 455/440; 455/441; 455/443

(58) Field of Classification Search .................. 455/436, 455/437, 429, 439, 440, 441, 443
See application file for complete search history.

(56) References Cited

U.S. PATENT DOCUMENTS

| | | | | |
|---|---|---|---|---|
| 5,678,185 A * | 10/1997 | Chia | ............... | 455/437 |
| 2003/0050084 A1* | 3/2003 | Damnjanovic et al. | ....... | 455/522 |
| 2006/0111112 A1* | 5/2006 | Maveddat | ..... | 455/439 |
| 2007/0115899 A1* | 5/2007 | Ovadia et al. | ................ | 370/338 |
| 2007/0123252 A1* | 5/2007 | Tronc et al. | ................... | 455/427 |
| 2008/0102835 A1* | 5/2008 | Zhao et al. | ..................... | 455/436 |
| 2010/0002654 A1* | 1/2010 | Lindoff et al. | ................ | 370/332 |

* cited by examiner

*Primary Examiner* — Nimesh Patel

(57) ABSTRACT

A device includes a first wireless transceiver initiating a communication session; and a second wireless transceiver. The device shifts the communication session to the second wireless transceiver if a signal strength of the first wireless transceiver is below a predetermined level and the signal strength is not expected to increase above the predetermined level.

13 Claims, 3 Drawing Sheets

METHOD AND SYSTEM FOR WIRELESS HANDOFFS

BACKGROUND

Many wireless communications devices are capable of communicating over more than network and using more than one communications protocol. Typically, the different networks and protocols may have differing capabilities and differing costs associated with use. In such devices, performance may be improved by optimizing the method which a given communications session uses for handing off from one network and protocol to another.

SUMMARY OF THE INVENTION

The present invention relates to a device which includes a first wireless transceiver initiating a communication session; and a second wireless transceiver. The device shifts the communication session to the second wireless transceiver if a signal strength of the first wireless transceiver is below a predetermined level and the signal strength is not expected to increase above the predetermined level.

The present invention also relates to a method which includes the following steps: communicating via a first communication protocol; determining, if a signal strength is below a predetermined signal threshold, a probability that the signal strength is expected to increase above the predetermined signal threshold; shifting communications to a second communication protocol, if the probability is below a predetermined probability threshold.

In addition, the present invention relates to a system which includes a plurality of access points having a coverage area; a mobile device conducting a communication session via at least one of the plurality of access points; and a wireless switch coordinating the access points. A position of the mobile device is monitored to determine whether the device is expected to exit the coverage area, and wherein the communication session is shifted to a network not including the access points if the mobile device is expected to exit the coverage area.

DETAILED DESCRIPTION

Figure 1:
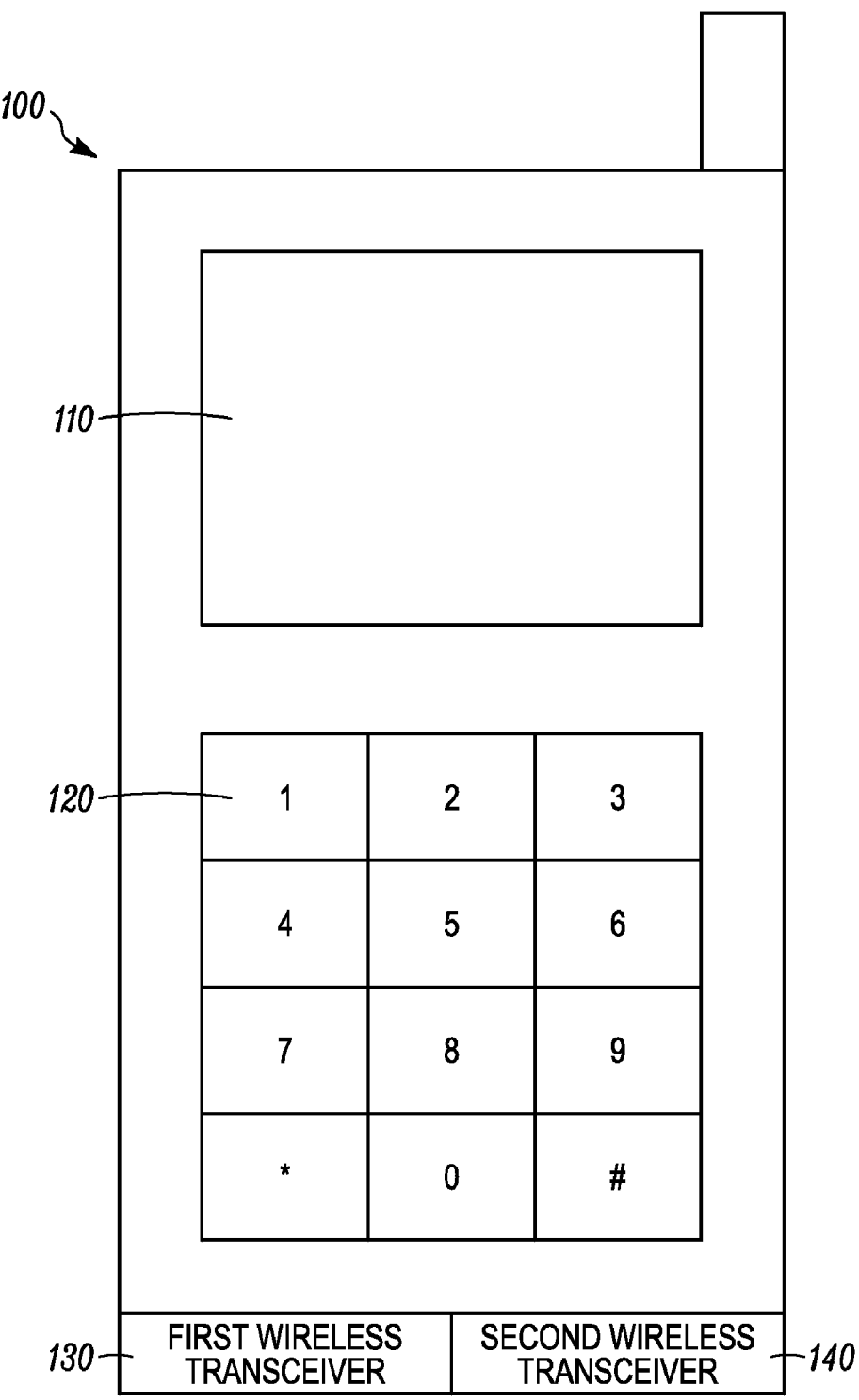
FIG. 1 shows an exemplary wireless communications device according to the present invention.

The exemplary embodiments of the present invention may be further understood with reference to the following description and the appended drawings, wherein like elements are referred to with the same reference numerals. The exemplary embodiments describe systems and methods for optimizing the handoff of a wireless communications session being conducted by a mobile communications device from one communications protocol to another. As used throughout this disclosure, a "network" will refer to a system of access points, relays, switches, etc., that facilitate the sharing of data among various users and devices. A "protocol" is a method by which networks handle various activities (e.g., authentication, data transfer, etc.).

Increasingly, many mobile telecommunications devices may be capable of communicating using more than one mechanism. In such situations, each mechanism may have advantages and disadvantages associated with its use. In one common example, a device may be capable of communicating using both a WiFi network and a cellular network, though those of skill in the art will understand that these are only exemplary and that the principles discussed herein are equally applicable to devices communicating using any other pair of protocols wherein one protocol may be preferred over the other. When communicating via a WiFi network, the financial cost and power usage may be lower. However, WiFi networks have limited coverage areas. Conversely, while a cellular network may enable communication over a much broader area, more power may be used and there may be a financial cost to access the cellular network. Such devices may typically prefer to use the WiFi network because of the lower cost, but must hand off a communications session to the cellular network if the WiFi signal is degrading. Because cost and performance are both significant concerns, the process of deciding when to hand off a session from WiFi to cellular is an important one.

Previously, this determination has been made using a fairly simple method. A device may monitor the strength of its WiFi signal, and compare that signal strength to a threshold. If the signal remains above the threshold, in a "switch to WiFi" (or, alternately, "stay with WiFi") range, the device continues conducting communications by WiFi. However, if the signal strength drops below the threshold, into a "switch to cellular" range, the communication is handed off to cellular. This method does not take into account any factors relating to the likelihood of losing or maintaining WiFi coverage. Further, if the threshold is set too low, there may be a gap in communications before switching, and if it is set too high, the device may use the cellular network too often and incur unnecessary and undesired costs.

FIG. 1 illustrates an exemplary mobile communications device 100 according to the present invention. The device 100 may be, for example, a mobile telephone, a mobile computing device, etc. The exemplary device 100 includes a display 110 (e.g., an LCD display) for providing information to a user. The device 100 also includes an input means 120 for receiving input from the user. In this exemplary embodiment, the input means 120 is shown as a keypad, but in other embodiments it may be a touchpad, etc. In some embodiments, the display 110 and the input means 120 may be integrated into a touch-sensitive screen. The device 100 also includes a first wireless transceiver 130 and a second wireless transceiver 140. Continuing with the above example, the first wireless transceiver 130 (also referred to as the "preferred wireless transceiver") is a WiFi transceiver and the second wireless transceiver 140 (also referred to as the "non-preferred wireless transceiver") is a cellular transceiver; however, as discussed above, there may be any number of transceivers and the transceivers 130 and 140 may be other types of transceivers for which one would be preferred over the other for various reasons.

Figure 2A:
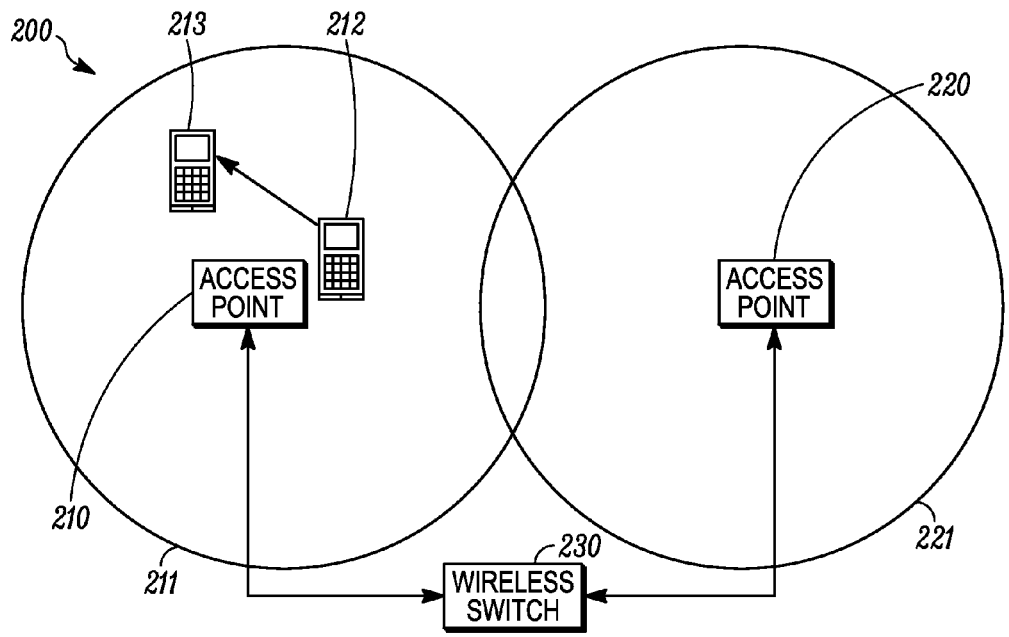
FIGS. 2a and 2b show an exemplary preferred wireless coverage network accessed by wireless communications devices such as that of FIG. 1. The preferred network may overlap with a broader non-preferred network.
Figure 2B:
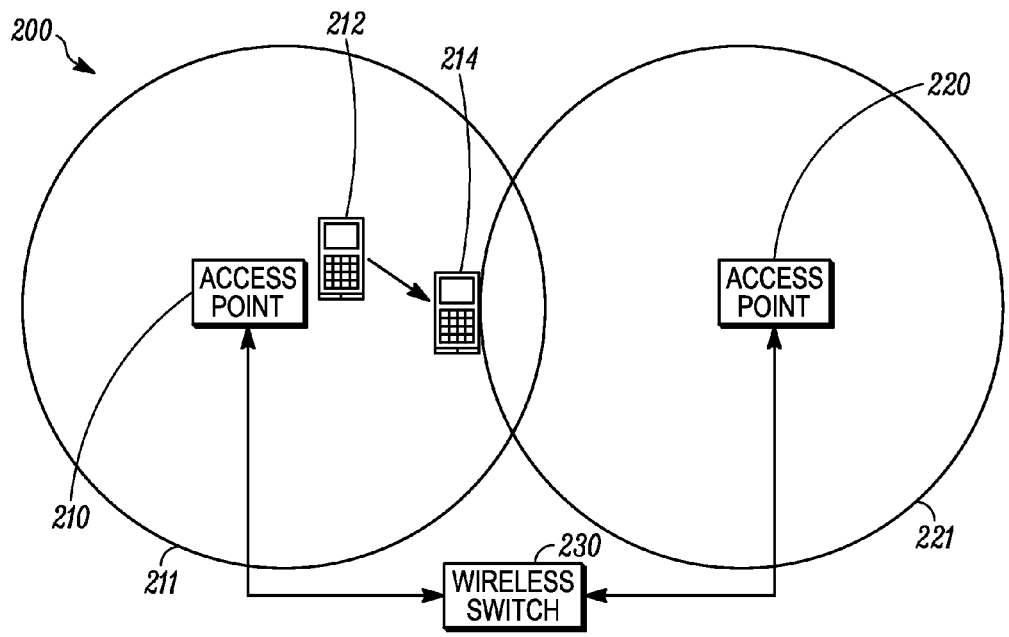

FIGS. 2a and 2b illustrate an exemplary coverage network 200 that may be accessed by the device 100. The coverage network 200 includes two access points 210 and 220; those of skill in the art will understand that an actual network may contain significantly more access points and that the illustration of two is merely exemplary. The access points 210 and 220 transmit and receive signals within coverage areas 211 and 221, respectively. The operations of the access points 210 and 220 are coordinated by a wireless switch 230; those of skill in the art will understand that in other embodiments, the network 200 may lack the wireless switch 230. Coverage area 211 includes location 212 close to its center and locations 213 and 214 near its periphery (represented in FIGS. 2a and 2b by the device 100 shown at each of the locations). The exemplary coverage network 200 provides wireless communications to the device 100 via the wireless transceiver 130 (e.g., the preferred transceiver); the coverage network 200 may also be within a broader overlapping network providing wireless communications via the non-preferred wireless transceiver 140.

Figure 3:
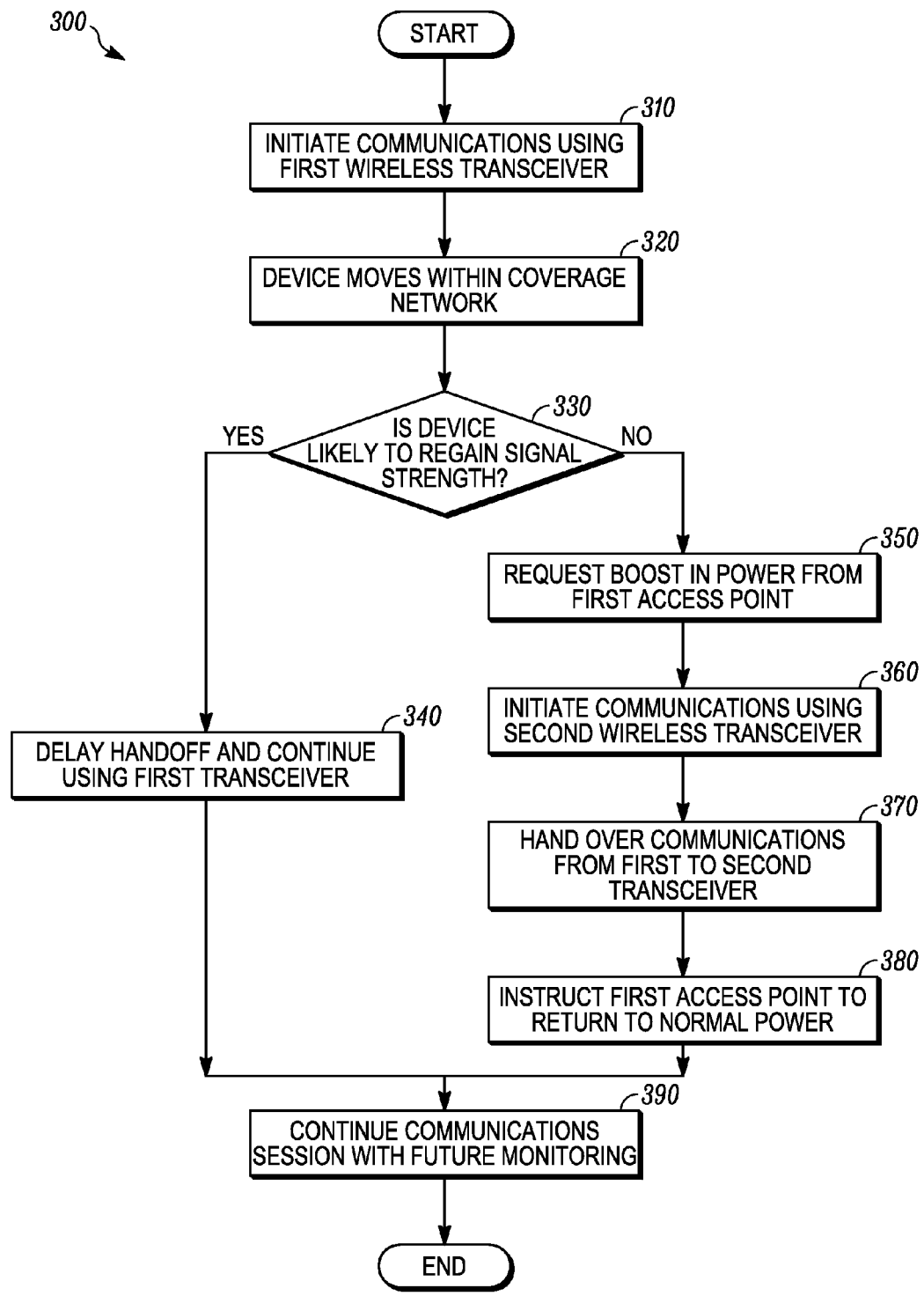
FIG. 3 shows an exemplary method for optimizing wireless communications handoff according to the present invention.

FIG. 3 illustrates an exemplary method 300 for coordinating wireless handoffs, described with reference to the exemplary device 100 of FIG. 1 and the exemplary coverage network 200 of FIG. 2. In step 310, the device 100 initiates a communications session (e.g., a voice call) using the first wireless transceiver 130 from a location that provides a strong signal to the transceiver 130 (e.g., location 212). The communications session is initiated using the transceiver 130 because it is preferred over the transceiver 140 and the signal is strong enough to do so at location 212. In step 320, while the communications session continues, the device 100 moves within the coverage network 200 and towards the edge of the coverage area 211. Consequently, the signal received by the wireless transceiver 130 weakens. FIGS. 2a and 2b illustrate two potential directions in which the device 100 might move.

Because the movement of step 320 results in a weakened signal reception by the wireless transceiver 130, in step 330 the device 100 determines whether it is likely to lose its signal with the wireless transceiver 130 (e.g., is moving towards the periphery of the network 200), or whether it is likely to regain a stronger signal with the transceiver 130 (e.g., is moving between access points of the network 200). This determination may be made, for example, by internal location tracking by the device 100 (e.g., by monitoring signal strength from the various access points 210, 220, and others in other networks), by location tracking by the wireless switch 230, etc. Parameters monitored may include position, heading and speed.

The monitored parameters may be evaluated with respect to a coverage map of the network 200. The coverage map may be stored in a memory of the device 100 or of the wireless switch 230. FIGS. 2a and 2b illustrate two exemplary positions of the device 100 within an exemplary coverage map of the network 200. In FIG. 2a, the device 100 has moved from an initial position 212 to a final position 213 that is towards the periphery of the coverage area 211. This proximity to the periphery of the coverage area 211 may trigger further evaluation of the motion of the device; however, the proximity alone may not trigger the initiation of a handoff process, as the device may have stopped or slowed its motion within the coverage area 211. Conversely, FIG. 2b illustrates a device that has moved from an initial position 212 to a final position 214 near the intersection of coverage areas 211 and 221. While a handoff decision-making process based purely on position would likely result in a conclusion that no handoff is required as the device 100 is merely migrating between different coverage areas of the network 200, if the device 100 continues moving rapidly in the same direction and soon begins approaching the boundary of the coverage area 221, a decision based on not just position but also speed and heading might initiate the handoff process. As discussed above, for the exemplary network of FIGS. 2a and 2b, the monitoring may be coordinated by a software application running on wireless switch 230; for an embodiment that lacks a wireless switch, the device 100 may track its location and store the coverage map that enables it to make this determination. In either case, location determination may be accomplished using any of various techniques known in the art.

It should be noted that in some embodiments, the network accessed using the non-preferred wireless transceiver 140 may also have a limited coverage area. In such embodiments, the possibility of degradation in the signal strength of the non-preferred wireless network may also be considered in deciding whether to hand off communications from the preferred wireless transceiver 130 to the non-preferred wireless transceiver 140. Further, if the signal strength received by the preferred wireless transceiver 130 is degrading and the non-preferred wireless transceiver 140 is not connected to a network capable of receiving a handoff, the device 100 may alert the user (e.g., by playing a warning tone) of an impending disconnect.

If it is determined that the device 100 is likely to regain signal strength using the transceiver 130 (e.g., is moving between access point 210 and access point 220, as illustrated in FIG. 2b), then in step 340, the decision for handoff from the transceiver 130 to the transceiver 140 is delayed, as the degradation of the signal received by the transceiver 130 can be expected not to lead to a dropped call.

However, if it is determined that the device 100 is unlikely to regain signal strength (e.g., is moving towards the periphery of the coverage network 200, as illustrated in FIG. 2a), then in step 350 the wireless switch 230 or the device 100 instructs or requests the access point 210 to temporarily boost its power, in order to extend coverage, allow extra time and reduce any audio gap while a handoff occurs. In step 360, the device 100 initiates communications using the non-preferred wireless transceiver 140 (e.g., initiates a cellular telephone connection). In step 370, the communications session is handed off from the transceiver 130 to the transceiver 140. Subsequently, in step 380, the wireless switch 230 or the device 100 informs the access point 210 that it can return its power to its normal level.

Finally, in step 390, which follows either step 340 or 380, the communication session continues, using either of the transceivers 130 or 140 depending on the preceding steps. Those of skill in the art will understand that the progress of the session may continue to be monitored at this point. For instance, if the session continued to be handled by the transceiver 130, future movement of the device may continue to be monitored to determine whether a handoff might subsequently be necessary; alternatively, if the communications were handed off, the device 100 might monitor for possible re-entry into the coverage network 200 for a potential opportunity to hand the session back off from the non-preferred transceiver 140 to the preferred transceiver 130.

Coverage maps may indicate areas of potential RF problems and also areas where coverage is likely to be good for the preferred network and for any other applicable network or networks. The frequency of sampling and evaluating the signal quality and the movements of the device may be based on the position of the device on the map, such as whether the device is close to periphery of the coverage, as well based on as any other environmental conditions (e.g., weather) which may impact the communication at the time.

By the implementation of the above-described exemplary embodiments, mobile devices may be able to determine whether to hand off wireless communications from one network/protocol to another in a more effective manner. This may insure that signal quality is maintained while the device may move throughout the course of a communication session, while making efficient decisions about when to hand off the communication session from one transceiver or protocol to another.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
    establishing a communication coverage area map of at least a first and a second access point in a first communication network that uses a first communication protocol;
    communicating by a communication device with the first access point in a first coverage area via a first communication protocol;
    evaluating a position and heading of the communication device and whether the device is approaching a periphery of the first coverage area of the first access point;
    if a signal strength is below a handoff signal threshold, delaying handoff to determine whether the device will be heading into a second coverage area of the second access point dependent on the position and heading of the communication device; and
    shifting communications to a second communication protocol of a second communication network, if the device will not be heading into the second coverage area of the second access point, and otherwise shifting communications to the second access point of the first communication protocol when the device enters the second coverage area.

2. The method of claim 1, further comprising:
    instructing the first access point to increase a power level, if the device is approaching a periphery of the first coverage area, prior to shifting communications; and
    instructing the first access point to decrease the power level, after shifting communications to either the second communication network or the second access point.

3. The method of claim 1, further comprising alerting a user of the device if a connection cannot be made with the second communication network.

4. The method of claim 1, wherein evaluating whether the device is approaching the periphery of the first coverage area includes determining a speed of the device.

5. A device, comprising:
    a first wireless transceiver initiating a communication session with a first access point within a first coverage area in a first communication network via a first communication protocol, wherein the first communication network has an established communication coverage area map of at least the first and a second access point with respective coverage areas;
    wherein the device is subject to a handoff if a position and heading of the communication device indicates whether the device is approaching a periphery of the first coverage area of the first access point, wherein if a signal strength is below a handoff signal threshold, a handoff of the device is delayed to determine whether the device will be heading into a second coverage area of the second access point dependent on the position and heading of the communication device, wherein if the device will be heading into the second coverage area of the second access point the communication session on the first wireless transceiver will be handed off to the second access point in the first communication network; and
    a second wireless transceiver, the device shifting the communication session to a second communication network with the second wireless transceiver if the device will not be heading into the second coverage area of the second access point.

6. The device of claim 5, wherein the device instructs the first access point communicating with the first transceiver to increase a power level, if the device is approaching a periphery of the first coverage area, the device instructing the first access point to decrease the power level after shifting the communication session to either the second wireless transceiver in the second communication network or the second access point in the first communication network.

7. The device of claim 5, wherein the device also determines a speed of the device in determining whether the device is approaching the periphery of the first coverage area.

8. A system, comprising:
    a plurality of access points each having a respective coverage area in a first communication network using a first communication protocol;
    a mobile device operable for conducting a communication session via at least a first one of the plurality of access points within its respective coverage area; and
    a wireless switch operable for coordinating the access points, and wherein the wireless switch can establish a communication coverage area map of the plurality of access points,
    wherein a position and heading of the mobile device can be monitored to determine whether the device is approaching a periphery of the first coverage area of the first access point, and wherein if a signal strength is below a handoff signal threshold, delaying handoff to determine whether the device will be heading into a second coverage area of another access point dependent on the position and heading of the communication device, and wherein the communication session is shifted to a second communication protocol of a second communication network if the device will not be heading into the second coverage area, and otherwise shifting the communication session to the other access point of the first communication protocol when the device enters the second coverage area.

9. The system of claim 8, wherein the monitoring by the wireless switch includes receiving a speed of the mobile device, which the wireless switch compares the coverage map stored in the wireless switch.

10. The system of claim 8, wherein the wireless switch compares the position of the mobile device and the heading of the mobile device to a coverage map stored in the wireless switch.

11. The system of claim 8, wherein the wireless switch instructs the first access point currently communicating with the mobile device to increase a power level if the device is approaching a periphery of the first coverage area prior to the mobile device shifting the communication session, and further instructs the access point to decrease the power level after the mobile device shifts the communication session to either the second communication network or the other access point in the first communication network.

12. The system of claim 8, wherein the position and heading of the mobile device is monitored by the mobile device.

13. The system of claim 8, wherein the handoff determination is made by the mobile device.

* * * * *